(12) United States Patent
Matsuoka

(10) Patent No.: US 10,368,012 B2
(45) Date of Patent: Jul. 30, 2019

(54) IMAGE CAPTURE APPARATUS, IMAGE PROCESSING SYSTEM, AND CONTROL METHOD THEREOF

(71) Applicant: CANON KABUSHIKI KAISHA, Tokyo (JP)

(72) Inventor: Masaaki Matsuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/057,295

(22) Filed: Aug. 7, 2018

(65) Prior Publication Data

US 2018/0352171 A1 Dec. 6, 2018

Related U.S. Application Data

(62) Division of application No. 14/699,702, filed on Apr. 29, 2015, now Pat. No. 10,070,068.

(30) Foreign Application Priority Data

May 2, 2014 (JP) .................................. 2014-095505

(51) Int. Cl.
  *H04N 5/262* (2006.01)
  *H04N 5/232* (2006.01)
  *G02B 7/34* (2006.01)

(52) U.S. Cl.
  CPC ....... *H04N 5/2621* (2013.01); *H04N 5/23212* (2013.01); *G02B 7/34* (2013.01)

(58) Field of Classification Search
  CPC ..... H04N 5/2621; H04N 5/23212; G02B 7/34
  See application file for complete search history.

(56) References Cited

U.S. PATENT DOCUMENTS

| 2011/0109775 | A1  | 5/2011 | Amano |
| 2012/0147227 | A1* | 6/2012 | Yoshimura ............. G02B 7/346 348/246 |
| 2013/0113987 | A1* | 5/2013 | Fukuda ................... G02B 7/28 348/349 |

FOREIGN PATENT DOCUMENTS

| JP | 2008-015754 A | 1/2008 |
| JP | 2011-077900 A | 4/2011 |
| JP | 2012-133408 A | 7/2012 |
| JP | 2012-142729 A | 7/2012 |

OTHER PUBLICATIONS

The above foreign references #2-4 were cited in a Feb. 2, 2018 Japanese Office Action, which is enclosed without English Translation, that issued in Japanese Patent Application No. 2014-095505.

* cited by examiner

*Primary Examiner* — Ahmed A Berhan
(74) *Attorney, Agent, or Firm* — Cowan, Liebowitz & Latman, P.C.

(57) ABSTRACT

When distribution image data indicating a defocus distribution is generated from a plurality of sets of image data including pupil-divided image data that is captured image data corresponding to part of an exit pupil, reduced image data is used. Further, based on the distribution image data, pixel data that is to be subjected to the image processing is extracted from the pupil-divided image data corresponding to the distribution image data. The extracted pixel data, the defocus distribution image data, and captured image data corresponding to the entirety of the exit pupil are recorded or output to an external device.

14 Claims, 12 Drawing Sheets

IMAGE CAPTURE APPARATUS, IMAGE PROCESSING SYSTEM, AND CONTROL METHOD THEREOF

CROSS-REFERENCE TO RELATED APPLICATIONS

This application is a divisional of application Ser. No. 14/699,702, filed Apr. 29, 2015 the entire disclosure of which is hereby incorporated by reference.

BACKGROUND OF THE INVENTION

Field of the Invention

The present invention relates to an image capture apparatus, an image processing system, and a control method thereof.

Description of the Related Art

Conventionally, there is known to be an image processing system in which a defocus distribution of a captured image is detected and image processing for locally changing a parameter corresponding to the defocus amount is applied to the captured image.

For example, Japanese Patent Laid-Open No. 2008-15754 discloses an image capture apparatus that includes an image sensor capable of generating a pair of images from which a defocus amount can be calculated, and locally adds a bokeh amount corresponding to the defocus amount to a captured image.

In the image capture apparatus disclosed in Japanese Patent Laid-Open No. 2008-15754, two types (a pair) of image data generated from the outputs of photoelectric conversion units of the same type are recorded when a captured image is recorded in response to a shutter release. Accordingly, in the case of using an image sensor with a configuration including two types of photoelectric conversion units per pixel, data size to be recorded doubles as compared to the case of using a normal image sensor having one photoelectric conversion unit per pixel. Therefore, the number of images that can be captured decreases compared to the case of using the normal image sensor. Further, in the case where image processing is performed by an image processing apparatus separate from the image capture apparatus, the time for data communication between the apparatuses increases. Further, since the data size doubles, the processing load required for data processing such as calculation of the defocus amount also increases.

The same problem occurs also in the case of using a pair of sets of image data captured by a stereo camera, or a pair of sets of image data captured at different focus distances. In recent years, with an increase in the number of pixels in image sensors, there are image sensors having more than 30,000,000 pixels, and therefore increases in data size are having a greater and greater influence.

SUMMARY OF THE INVENTION

The present invention aims to lighten the load of image processing corresponding to a defocus distribution obtained from a plurality of images and to provide an image capture apparatus and an image processing system capable of improving at least one of the problems of the conventional techniques.

According to an aspect of the present invention, there is provided an image capture apparatus comprising: a reduction unit configured to reduce a plurality of sets of captured image data including pupil-divided image data, which is captured image data corresponding to part of an exit pupil, and generate a plurality of sets of reduced image data; a generation unit configured to, on at least a pair of the plurality of sets of reduced image data that include reduced image data of the pupil-divided image data, perform processing in which a pair of sets of reduced image data are used to generate distribution image data that indicates a spatial defocus distribution; an extraction unit configured to, based on the distribution image data, extract data of pixels that are to be subjected to predetermined image processing from the pupil-divided image data corresponding to the distribution image data; and an output unit configured to output the extracted pixel data, the distribution image data, and captured image data corresponding to the entirety of the exit pupil.

According to another aspect of the present invention, there is provided an image capture apparatus comprising: a generation unit configured to, on at least a pair of a plurality of sets of captured image data including pupil-divided image data, which is captured image data corresponding to a part of an exit pupil, perform processing in which a pair of sets of captured image data are used to generate distribution image data indicating a spatial defocus distribution; a reduction unit configured to, from the distribution image data, generate distribution image data indicating a defocus distribution with a lower density than the distribution image data; an extraction unit configured to extract pixel data having a defocus amount as a target of a predetermined image processing from pixel data constituting the distribution image data generated by the generation unit; and an output unit configured to output the extracted pixel data, the distribution image data generated by the reduction unit, and captured image data corresponding to the entirety of the exit pupil.

According to still another aspect of the present invention, there is provided an image capture apparatus comprising: a reduction unit configured to reduce a plurality of sets of captured image data including pupil-divided image data, which is captured image data corresponding to a part of an exit pupil, and generate a plurality of sets of reduced image data; a generation unit configured to, on at least a pair of the plurality of sets of reduced image data that include reduced image data of the pupil-divided image data, perform processing in which a pair of sets of reduced image data are used to generate distribution image data that indicates a spatial defocus distribution; and an output unit configured to output the distribution image data and the plurality of sets of captured image data.

According to yet another aspect of the present invention, there is provided method for controlling an image capture apparatus, comprising: a reduction step of reducing a plurality of sets of captured image data including pupil-divided image data, which is captured image data corresponding to part of an exit pupil, and generating a plurality of sets of reduced image data; a generation step of performing processing in which a pair of sets of reduced image data are used to generate distribution image data indicating a spatial defocus distribution, on at least a pair of the plurality of sets of reduced image data that include reduced image data of the pupil-divided image data; an extraction step of extracting, based on the distribution image data, pixel data that is to be subjected to a predetermined image processing from the pupil-divided image data that corresponds to the distribution image data; and an output step of outputting the extracted pixel data, the distribution image data, and captured image data corresponding to the entirety of the exit pupil.

According to still yet another aspect of the present invention, there is provided a method for controlling an image capture apparatus, comprising: a generation step of performing processing in which a pair of sets of captured image data are used to generate distribution image data indicating a spatial defocus distribution, on at least a pair of a plurality of sets of captured image data including pupil-divided image data that is captured image data corresponding to a part of an exit pupil; a reduction step of generating, from the distribution image data, distribution image data indicating a defocus distribution with a lower density than the distribution image data; an extraction step of extracting pixel data having a defocus amount as a target of a predetermined image processing from pixel data constituting the distribution image data generated in the generation step; and an output step of outputting the extracted pixel data, the distribution image data generated in the reduction step, and captured image data corresponding to the entirety of the exit pupil.

According to yet still another aspect of the present invention, there is provided a method for controlling an image capture apparatus, comprising: a reduction step of reducing a plurality of sets of captured image data including pupil-divided image data that is captured image data corresponding to part of an exit pupil so as to generate a plurality of sets of reduced image data; a generation step of applying processing in which a pair of sets of reduced image data are used to generate distribution image data indicating a spatial defocus distribution, on at least a pair of the plurality of sets of reduced image data that include reduced image data of the pupil-divided image data; and an output step of outputting the distribution image data and the plurality of sets of captured image data.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

First Embodiment

Figure 1A:
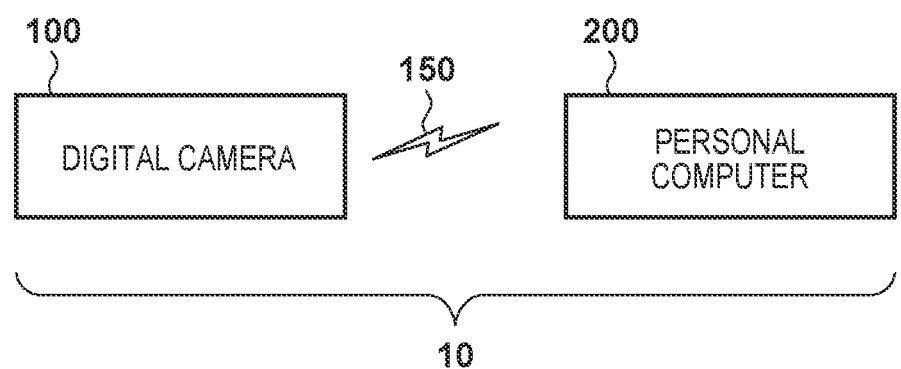
FIGS. 1A to 1C are block diagrams showing examples of functional configurations of an image processing system, a digital camera, and a personal computer according to an embodiment.

Hereinafter, an exemplary embodiment of the present invention will be described in detail with reference to the drawings. The following embodiment will describe an example in which the present invention is applied to an image processing system 10, in which a digital camera 100 serving as an example of an image capture apparatus and a personal computer (PC) 200 serving as an example of an image processing apparatus are communicably connected to each other, as shown in FIG. 1A. However, the processing performed by the PC 200 in the following description may be executed by the digital camera 100. Further, the digital camera 100 may be any electronic device having an image capturing function, and the PC 200 also may be any electronic device capable of performing the processing described below. In the following description, "adding bokeh" to an image means reducing the sharpness of the image or blurring the image.

Figure 1B:
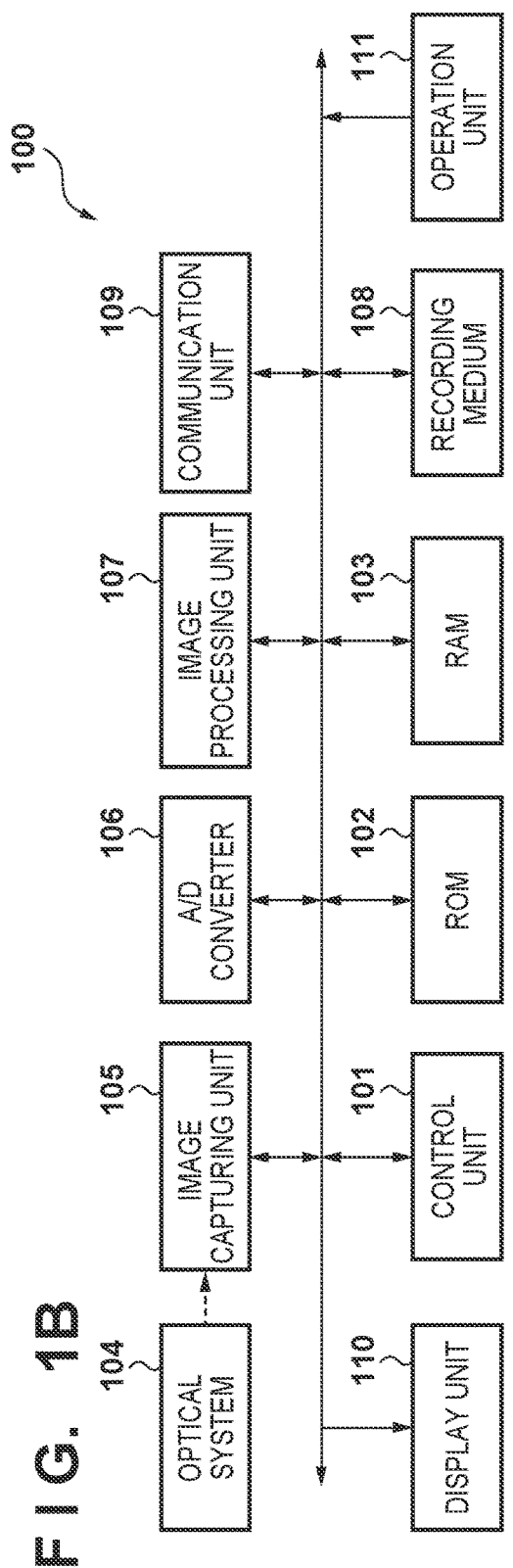

FIG. 1B is a block diagram showing an example of a functional configuration of the digital camera 100 according to this embodiment. A control unit 101, for example, is a CPU, and controls the operation of each block included in the digital camera 100 by reading out a program from a ROM 102, deploying it to a RAM 103, and executing it. The ROM 102 is a rewritable non-volatile memory, and stores parameters and the like that are necessary for the control of the blocks, in addition to the program executed by the control unit 101. The RAM 103 is a rewritable volatile memory, and is used as a temporary storage region for data output by the blocks included in the digital camera 100.

An optical system 104 forms a subject image in an image capturing unit 105. For example, the image capturing unit 105 is an image sensor, such as a CCD or CMOS sensor, which photoelectrically converts the subject image formed by the optical system 104 and outputs the thus-obtained analog image signals to an A/D converter 106. The A/D converter 106 applies A/D conversion processing to the input analog image signals and outputs the obtained digital image data to the RAM 103.

An image processing unit 107 applies various types of image processing, such as white balance adjustment, demosaicing, reduction/enlargement, filtering, encoding, and decoding, to the image data stored in the RAM 103.

A recording medium 108, for example, may be a detachable memory card, and is used for recording the image data processed by the image processing unit 107, the image data output from the A/D converter 106, and the like, which are stored in the RAM 103, as an image data file of a predetermined format. A communication unit 109 transmits the image data file or the like that is recorded in the recording medium 108 to an external device by wire or wirelessly.

A display unit 110 displays image data obtained by shooting or image data read out from the recording medium 108, or displays various menu screens. It also functions as an electronic viewfinder by displaying a live view image.

An operation unit 111 is an input device group for allowing a user to input various instructions, settings, and the like to the digital camera 100, and includes keys or buttons that are included in a general digital camera, such as a shutter button, a menu button, a direction key, and a determination key. Further, in the case where the display unit 110 is a touch display, the display unit 110 serves also as the operation unit 111. The operation unit 111 may have a configuration that does not require physical operation, such as a combination of a microphone and a voice command recognition unit.

Figure 1C:
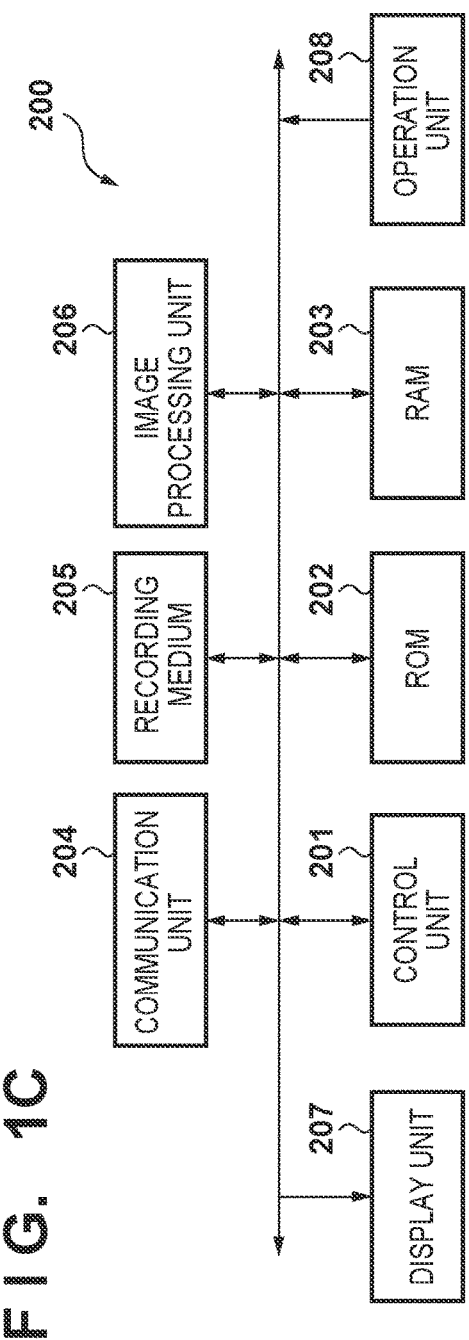

FIG. 1C is a block diagram showing an example of a functional configuration of the PC 200 according to this embodiment. A control unit 201, for example, is a CPU, and controls the operation of each block included in the PC 200 by reading out a program from a ROM 202, deploying it to a RAM 203, and executing it. The ROM 202 is a rewritable non-volatile memory, and stores parameters and the like that are necessary for the control of the blocks in addition to the program executed by the control unit 201. The RAM 203 is a rewritable volatile memory, and is used as a temporary storage region for data output by the blocks included in the PC 200.

A communication unit 204 communicates with an external device such as the digital camera 100 via wired or wireless communication. A recording device 205, for example, is a hard disk, and stores image data received by the communication unit 204 from the digital camera 100 or the like.

An image processing unit 206, for example, applies image processing corresponding to a later-described defocus amount to the image data deployed from the recording device 205 to the RAM 203.

A display unit 207 is used for displaying various types of data or a GUI provided by an OS or an application operating in the PC 200. The display unit 207 may be included in the PC 200, or may be connected thereto as an external device.

An operation unit 208 is an input device group for allowing the user to input various instructions, settings, and the like to the PC 200, and usually includes a keyboard, a mouse, a track pad, and the like. Further, in the case where the display unit 207 is a touch display, the display unit 207 serves also as the operation unit 208. The operation unit 208 may have a configuration that does not require physical operation, such as a combination of a microphone and a voice command recognition unit.

Figure 2:
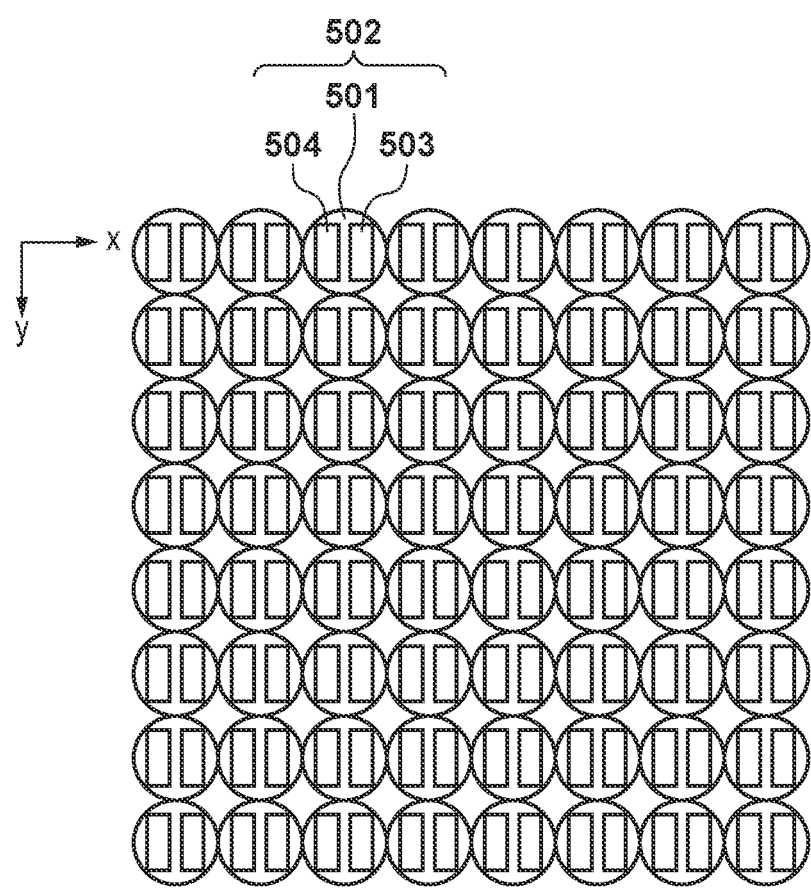
FIG. 2 is a diagram showing an example of a pixel array of an image capturing unit according to the embodiment.

FIG. 2 is a schematic view showing an example of a pixel array of the image capturing unit 105. The image capturing unit 105 of this embodiment has a plurality of pixels that are two-dimensionally arrayed, and each pixel 502 has a microlens 501 and a pair of photoelectric conversion units 503 and 504. Here, image data that is obtained from the photoelectric conversion unit 503 group and corresponds to the right focus detection pupil is expressed as R (x, y), and image data that is obtained from the photoelectric conversion unit 504 group and corresponds to the left focus detection pupil is expressed as L (x, y) (where x and y are integers of 0 or more). The image capturing unit 105 of this embodiment outputs R (x, y) and basic image data g (x, y) in the following formula as a pair of captured image data sets.

$$g(x,y)=R(x,y)+L(x,y) \quad (1)$$

That is, the image capturing unit 105 outputs image data obtained by the photoelectric conversion unit 503 group, and image data obtained by adding the image data obtained by the photoelectric conversion unit 503 group and the image data obtained by the photoelectric conversion unit 504 group. The basic image data g (x, y) is image data that corresponds to the entirety of the exit pupil.

The pair of sets of image data output by the image capturing unit 105 may be another combination. For example, a combination of L (x, y) and g (x, y) or a combination of R (x, y) and L (x, y) may be employed.

Hereinafter, the operation of an image processing system of this embodiment will be described with reference to FIG. 3 to FIG. 5.

Figure 4:
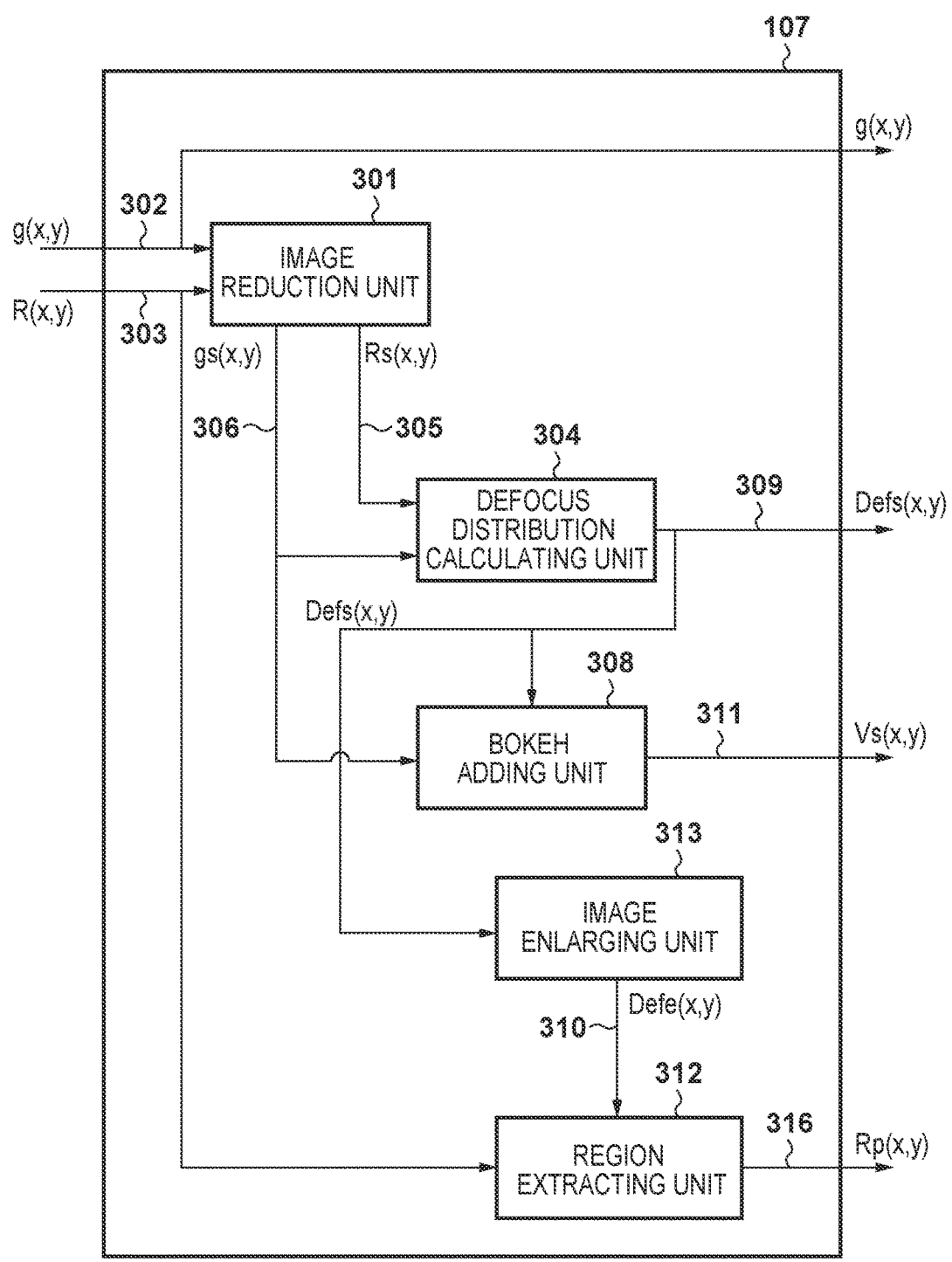
FIG. 4 is a block diagram showing an example of a functional configuration of an image processing unit 107 in FIG. 1B.

FIG. 4 is a diagram schematically showing functions of the image processing unit 107. In FIG. 4, functional blocks corresponding to various types of image processing that can be applied by the image processing unit 107 are depicted for convenience of description. However, in FIG. 4, the steps of image processing for applying a bokeh amount corresponding to a defocus amount are shown schematically using the functional blocks and thus FIG. 4 does not necessarily match the actual configuration. For example, in the case where the image processing unit 107 is a programmable processor such as a GPU or a DSP, the functional blocks may be implemented by software, and further, the input-output lines between the functional blocks may be absent.

An image reducing unit 301 reduces the size of basic image data g (x, y) 302 and image data R (x, y) 303 that corresponds to the right focus detection pupil, which are stored in the RAM 103, to 1/N horizontally and 1/N (N>1) vertically. The reducing method is not specifically limited, and generally-known methods such as a bicubic method, for example, can be used therefor. In this embodiment, it is assumed that image data before the reduction has 6400 pixels horizontally×4800 pixels vertically, and N is 4. Accordingly, the image reducing unit 301 generates reduced image data Rs (x, y) 305 and gs (x, y) 306 with 1600 pixels horizontally×1200 pixels vertically from the R (x, y) 303 and the g (x, y) 302, and outputs them.

Based on the Rs (x, y) 305 and the gs (x, y) 306 that are output by the image reducing unit 301, a Def distribution calculating unit 304 outputs image data Defs (x, y) 309, which indicates a spatial defocus distribution in the image capture range. A defocus amount is an amount of focus shift from the distance at which the optical system 104 is in focus, and thus is also distance information. In this embodiment, since the defocus amount is calculated using the reduced image data, the processing load of the Def distribution calculating unit 304 is significantly lightened as compared to the case where the defocus amount is calculated with respect to the original image data. Accordingly, the defocus amount can be calculated at a higher speed, the performance required of the Def distribution calculating unit 304 can be suppressed, and the circuit scale and power consumption can be reduced.

The Def distribution calculating unit 304 first calculates Ls (x, y) by subtracting the Rs (x, y) 305 from the gs (x, y) 306.

Then, the Def distribution calculating unit 304 determines the spatial defocus distribution by dividing the reduced image data Rs (x, y) and Ls (x, y), which correspond to the left and right focus detection pupils respectively, into a plurality of small blocks and calculating a defocus amount for each corresponding small block.

Data of m pixels is extracted from the Rs (x, y) and Ls (x, y) in the detection direction of the defocus amount (for example, in the x direction), and the respective data series are expressed as (E(1) to E(m)) and (F(1) to F(m)) in a generalized manner. The Def distribution calculating unit

304 calculates a correlation amount C(k), when the data series (F(1) to F(m)) are displaced by a displacement amount k relative to the data series (E(1) to E(m)), using the following Formula (2).

$$C(k)=\Sigma|E(n)-F(n+k)| \quad (2)$$

In Formula (2), Z is calculated with respect to n, and n and (n+k) are limited to the range of 1 to m. The displacement amount is an integer, and is a relative shift amount obtained using the extraction pitch of pixel data constituting the data series as a unit. Since this embodiment uses the image data reduced to 1/N in the horizontal and vertical directions, the reduced image data needs to be multiplied by N in order to be expressed in terms of the pitch of the image data before the reduction.

Letting the displacement amount k at which the discrete correlation amount C(k) is the minimum be kj, the Def distribution calculating unit 304 can determine the displacement amount x at which a continuous correlation amount C(x) takes the minimum value, using the following formulas.

$$x=(kj+D/\text{SLOP})\cdot N \quad (3)$$

$$D=\{C(kj-1)-C(kj+1)\}/2 \quad (4)$$

$$\text{SLOP}=\text{MAX}\{C(kj+1)-C(kj),C(kj-1)-C(kj)\} \quad (5)$$

Based on the displacement amount x determined by Formula (3), the Def distribution calculating unit 304 can determine a defocus amount Def with respect to a planned image forming surface of a subject image surface using Formula (6). Multiplication by N at the end of Formula (3) is performed in order to restore the extraction pitch of pixel data in the reduced image data to the pitch in the image data before the reduction, and N is 1 when processing for detecting the defocus amount is performed without using the reduced image data.

$$\text{Def}=KX\cdot PY\cdot x \quad (6)$$

PY in Formula (6) is the extraction pitch of pixel data, to which the pitch in the image before the reduction is applied, regardless of whether or not the image is reduced. KX is a conversion factor determined depending on the size of the divergence angle of the barycenters or centers of the pair of focus detection pupils.

In the calculation of Formula (2) to Formula (6), the defocus amount is calculated by allocating corresponding small blocks to the coordinates (x, y) of an input image, and therefore the defocus amount is calculated for each pixel (coordinate) of the input image. Such data indicating the defocus distribution is called defocus distribution image data in this description since it has the same data configuration as the input image (which is herein 1600 pieces of data horizontally x 1200 pieces of data vertically) and the defocus amount is also distance information.

Further, the defocus distribution image data output by the Def distribution calculating unit 304 is generated from the reduced image data, and therefore is called reduced defocus distribution image data Defs (x, y) 309. As described above, small blocks are arranged for each pixel in the calculation of the defocus amount, and therefore small blocks arranged for the pixel with coordinates (x, y) and small blocks arranged for the pixel with coordinates (x+1, y) partially overlap each other, for example. For example, the small blocks can be arranged so that corners of the small blocks serve as target pixels, but there is no limitation to this.

A bokeh adding unit 308 adds bokeh corresponding to the defocus amount Def indicated by the reduced defocus distribution image data Defs (x, y) 309 to the reduced basic image data gs (x, y) 306, and outputs bokeh-added reduced basic image data Vs (x, y) 311. Specifically, the bokeh adding unit 308 applies a convolution operation on reduction point spread function PSF (x, y) by bokeh to the gs (x, y) 306, as shown in Formula (7), so as to generate bokeh-added reduced basic image data Vs (x, y) 311.

$$Vs(x,y)=gs(x,y) \diamond \text{PSF}(x,y) \quad (7)$$

In Formula (7), ◇ denotes a two-dimensional convolution operation. For example, the bokeh-added reduced basic image data Vs (x, y) 311 is displayed on the display unit 110 and used by the user for simply checking the quality of the image resulting from image processing with the digital camera 100 in FIG. 1A and FIG. 1B.

The reduction point spread function PSF (x, y) applied by the bokeh adding unit 308, for example, may be as follows.

$$\text{PSF}(x,y)=1/(\pi\cdot r^2) \text{ if } x^2+y^2 \leq r^2$$

$$\text{PSF}(x,y)=0 \text{ if } x^2+y^2 > r^2 \quad (8)$$

In Formula (8), r denotes the radius of point image bokeh, where PSF (x, y)=δ (x, y) is true when r=0.

$$r=0 \text{ if } |\text{Def}| \leq \text{Def0}$$

$$r=Zf\cdot(|\text{Def}|-\text{Def0})/N \text{ if Def0}<|\text{Def}|\leq\text{Def1}$$

$$r=Zf\cdot(\text{Def1}-\text{Def0})/N \text{ if Def1}<|\text{Def}| \quad (9)$$

$$\text{Def1}=M\cdot\text{Def0} \quad (10)$$

In Formulas (9) and (10), Zf is a bokeh intensity parameter which is manually input by operating the operation unit 111 or is stored in advance in the ROM 102, for example. Def0 is a parameter indicating the depth of field, and no bokeh is added to subject images within the depth of field. M is a parameter for determining the Def range within which the size of bokeh is changed, and any parameter greater than or equal to 1 can designated therefor, but M is 2 in this embodiment. When the defocus amount increases to some extent, it becomes difficult to visually recognize a change of the radius of point image bokeh in the bokeh-added basic image, and therefore the radius of point image bokeh with a Def exceeding Def1 is not changed. Division by N in Formula (9) is performed because the pixel extraction pitch of the data series is N times the value in the image before the reduction, and N is 1 when the reduced image is not used.

An image enlarging unit 313 enlarges the reduced defocus distribution image data Defs (x, y) 309 so that it has the same number of pixels as the R (x, y) 303, which is an extraction target of a region extracting unit 312, and outputs it as defocus distribution image data Defe (x, y) 310. Here, the image enlarging unit 313 enlarges it N times horizontally and N times vertically, conversely to the image reducing unit 301. The enlarging method is not particularly limited, and generally-known methods such as a bicubic method, for example, can be used therefor. Increasing the number of pixels in the defocus distribution image is equivalent to increasing the density of the defocus distribution.

The region extracting unit 312 extracts a specific region from the image data R (x, y) 303 corresponding to the right focus detection pupil based on the defocus distribution, or more specifically, the defocus distribution image data Defe (x, y) 310, and outputs extracted image data Rp (x, y) 316. The specific region is a region that is to be a target of image processing corresponding to the defocus amount.

For each pixel of the R (x, y), the region extracting unit 312 determines whether or not to output (extract) the target pixel of the R (x, y) by referring to the defocus amount indicated by the corresponding pixel of the defocus distribution image data Defe (x, y).

Specifically, letting the defocus amount indicated by the Def (x, y) be Defm, the region extracting unit 312 performs determination such that: pixels satisfying |Defm|≤Def0 are not output; pixels satisfying Def0<|Defm|≤Def1 are output; and pixels satisfying Def1<|Defm| are not output, and outputs the extraction data Rp (x, y).

In this embodiment, the reduced defocus distribution image data Defs (x, y) generated by the Def distribution calculating unit 304 is enlarged by the image enlarging unit 313, but Defs (x, y) that is to be input into the image enlarging unit 313 may be generated separately.

Figure 3:
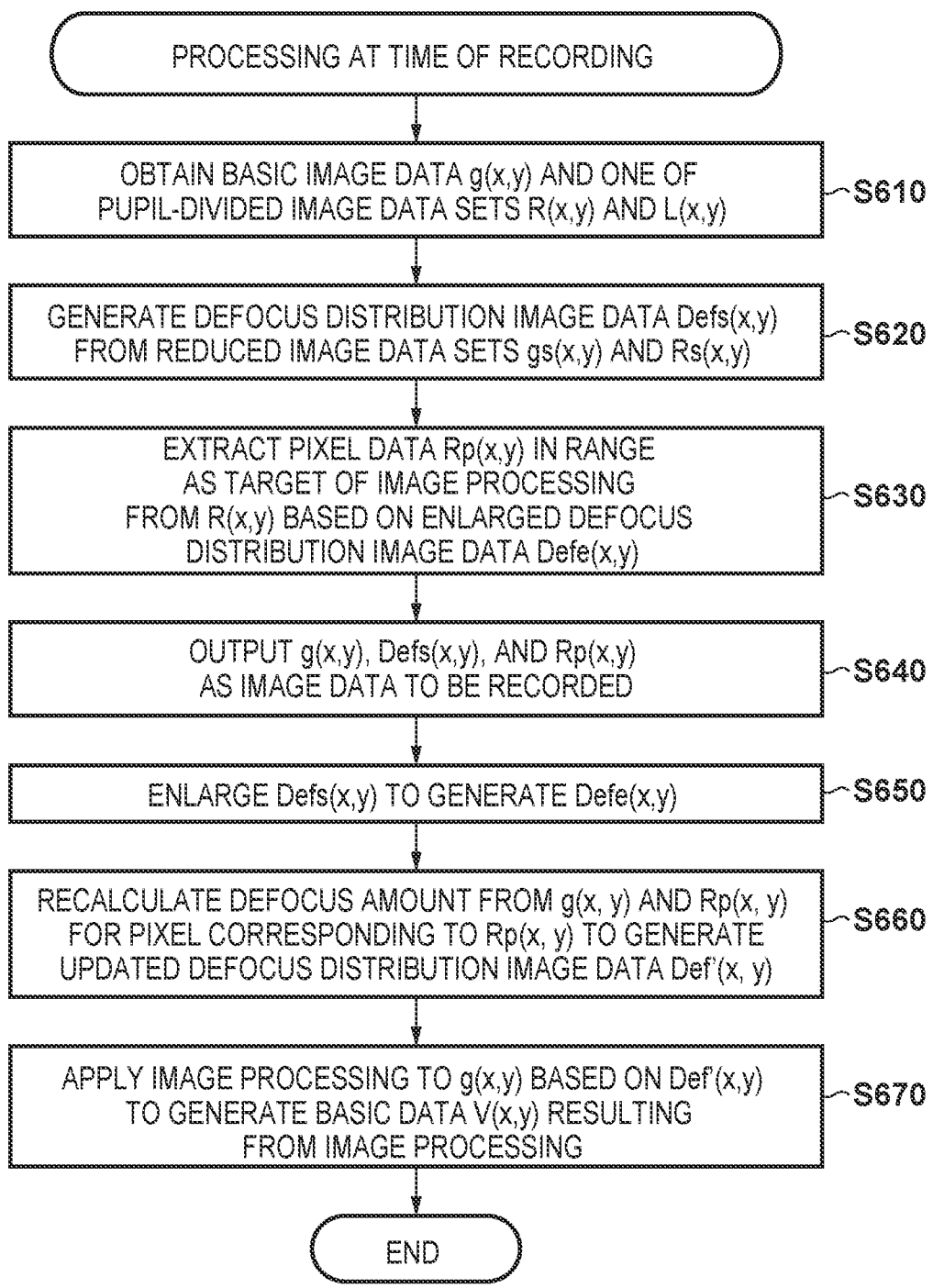
FIG. 3 is a flowchart illustrating the operation of an image processing system according to a first embodiment.

When a shooting instruction such as a full press of the shutter button is input through the operation unit 111, the digital camera 100 of this embodiment executes processing at the time of recording shown in FIG. 3. The control unit 101 performs shooting processing in accordance with exposure conditions determined in a shooting preparation state, and obtains a pair of captured image data sets from the image capturing unit 105. Here, as described above, the basic image data g (x, y) and one (R (x, y)) of the pupil-divided image data sets R (x, y) and L (x, y) are obtained as captured image data and are stored in the RAM 103 (S610).

Then, the aforementioned processing is applied using the image processing unit 107. That is, a defocus distribution image Defs (x, y) is generated by the Def distribution calculating unit 304 from the reduced image data sets gs (x, y) and Rs (x, y) generated by the image reducing unit 301 (S620). Then, based on the Defe (x, y) generated by the image enlarging unit 313 enlarging the defocus distribution image Defs (x, y), pixel data that is to be a target of image processing is extracted from the R (x, y), and thereby the extraction data Rp (x, y) is generated (S630).

Subsequently, the control unit 101 transmits the image data to the PC 200 through the communication unit 109 (S640). In this embodiment, processing of step S650 and onward is performed by the PC 200, and therefore will be described later. It should be noted that the following image data may be transmitted to the PC 200 through the communication unit 109 after being recorded in the recording medium 108, or the following image data may be read out by the PC 200 from the recording medium 108 detached from the digital camera 100.

Basic image data g (x, y) (6400×4800 pixels)
Reduced defocus distribution image data Defs (x, y) (1600×1200 pixels)
Extraction data Rp (x, y)

Although the amount of Rp (x, y) depends on the defocus distribution, pixels in a region within the depth of field and pixels in a region with a comparatively large defocus amount are excluded. Therefore, the number of pixels is normally significantly lower than 6400×4500 (=6400×4800−1600× 1200) pixels.

Further, in FIG. 4, the basic image data g (x, y) is depicted as being output from the image processing unit 107, but it may be read out from the RAM 103 by the control unit 101 at the time of recording or transmission. The aforementioned three sets of image data may be recorded or transmitted collectively as one data file, or may be recorded or transmitted as separate files. However, in the latter case, it is necessary to make them recognizable as being associated data files, for example, by giving them the same file name or placing them in the same folder. Since the file structure in recording or transmission, the transmission control corresponding to the transmission protocol, and the like are not directly relevant to the present invention and known methods can be used therefor, detailed descriptions thereof will be omitted.

Accordingly, the amount of data to be recorded or transmitted can be cut in most cases, such as a case of transmitting:

the image data R (x, y) (6400×4800 pixels) corresponding to the right focus detection pupil; and the image data L (x, y) (6400×4800 pixels) corresponding to the left focus detection pupil. Therefore, the number of images that can be captured by the digital camera 100 can be increased, and the time for communicating with an external device can be further shortened, according to which it is possible not only to improve the usability, but also to reduce the power consumption of the digital camera 100.

Figure 5:
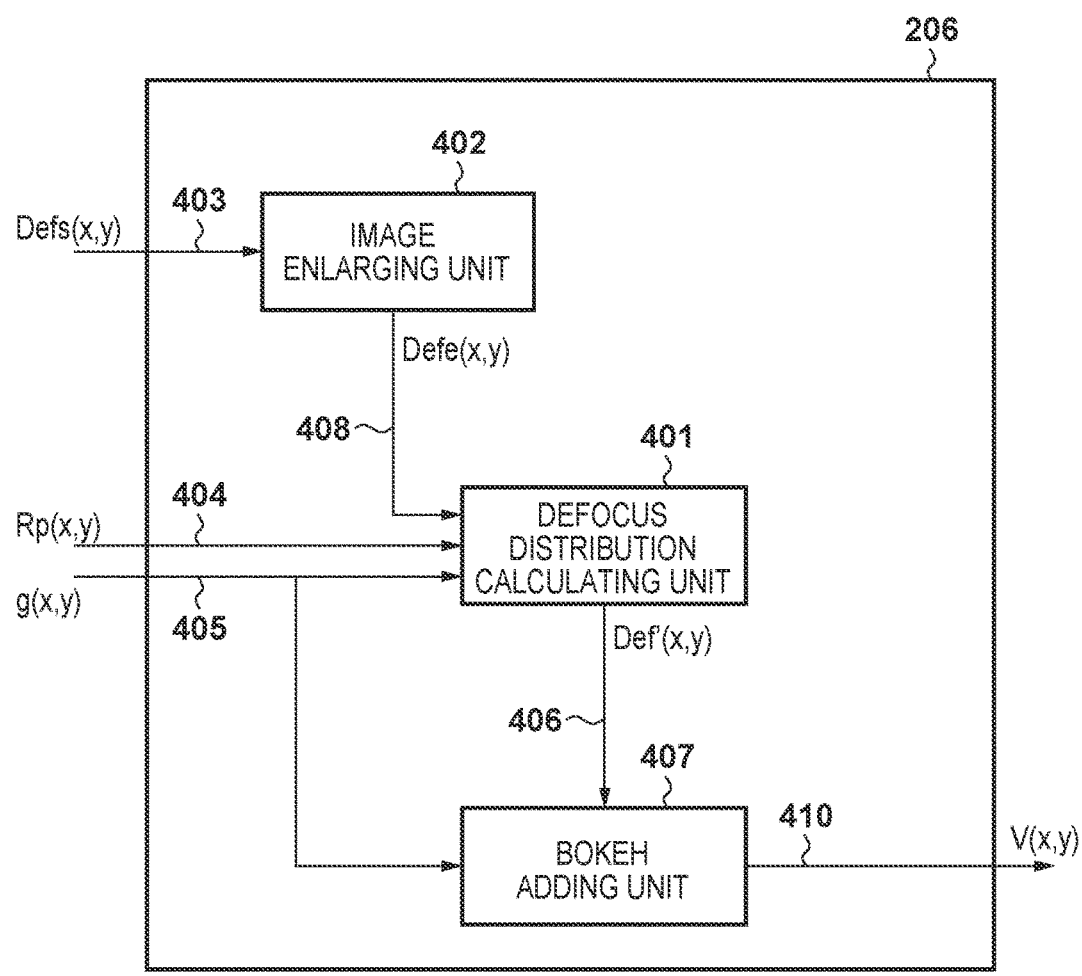
FIG. 5 is a block diagram showing an example of a functional configuration of an image processing unit 206 in FIG. 1C.

FIG. 5 is a block diagram schematically showing an example of the functional configuration of the image processing unit 206 included in the PC 200 of this embodiment. Hereinafter, the operation of the image processing unit 206 will be described with reference to FIG. 3. The operation of the image processing unit 206 is realized in accordance with the control of the control unit 201.

An image enlarging unit 402 enlarges reduced defocus distribution image data Defs (x, y) 403 so as to generate defocus distribution image data Defe (x, y) in the same manner as the image enlarging unit 313 included in the image processing unit 107 of the digital camera 100 (S650). Specifically, the image enlarging unit 402 generates the Defe (x, y) by enlarging the reduced defocus distribution image data Defs (x, y) 403 N times horizontally and N times vertically so that the resolution (the number of pixels) thereof matches that of basic image data g (x, y) 405. The image enlarging unit 402 outputs defocus distribution image data Defe (x, y) obtained by the enlargement to a Def distribution calculating unit 401 and a bokeh adding unit 407.

For each pixel of the defocus distribution image data Defe (x, y), the Def distribution calculating unit 401 determines whether or not to recalculate (update) the defocus amount indicated by the pixel.

Specifically, letting the defocus amount indicated by pixel data constituting the defocus distribution image data be Defm, the Def distribution calculating unit 401 performs determination such that:

when |Defm|≤Def0 is satisfied, Defm is not updated (Defm is output);

when Def0<|Defm|≤Def1 is satisfied, Defm is updated; and when Def1<|Defm| is satisfied, Defm is not updated (Defm is output). The Def0 and Def1 used herein are the same as those used in Formulas (9) and (10).

In this way, the defocus amount is not recalculated for pixels within the depth of field (|Defm|≤Def0) and pixels whose Def exceeds Def1, and the defocus amount calculated in the digital camera 100 is used as-is. The range of the defocus amount to be recalculated (Def0<|Defm|≤Def1) is a range that is the target of the processing for adding bokeh (changing the radius of point image bokeh) in the bokeh adding unit 407 and is a range that is the extraction target in the region extracting unit 312.

In this way, the defocus amount is recalculated only for the pixels having a defocus amount such that the radius of the point image bokeh is changed by the bokeh adding unit 407, and therefore the defocus distribution can be calculated at high speed. Further, since the defocus distribution image data Defs (x, y) received from the digital camera 100 is generated from the reduced image, the Defe (x, y) resulting from the enlargement performed by the image enlarging unit 402 also has a rough defocus resolution (resolution of the displacement amount). Accordingly, a high defocus resolution is obtained by recalculating the defocus amount based on image data that has not been reduced for the target whose bokeh amount is adjusted corresponding to the defocus amount.

Hereinafter, processing for recalculating (updating) the defocus amount will be described.

The Def distribution calculating unit 401 determines left focus detection pupil image data Lp (x, y) corresponding to the Rp (x, y) from the basic image data g (x, y) and the extraction data Rp (x, y) received from the digital camera 100. Specifically, the Def distribution calculating unit 401 obtains the Lp (x, y) by subtracting the Rp (x, y) from the g (x, y). As described above, the Rp (x, y) is obtained by extracting pixel data having a defocus amount that falls under Def0<|Defm|≤Def1 from the R (x, y).

The Def distribution calculating unit 401 calculates the correlation amount C(k) for each small block by performing the same processing as that performed by the Def distribution calculating unit 304 on the Rs (x, y) and the Ls (x, y), on the pair of image data sets Rp (x, y) and Lp (x, y).

At this time, the Def distribution calculating unit 401 refers to the defocus amount Defm that is indicated by the defocus distribution image data Defe (x, y) supplied from the image enlarging unit 402, and adjusts a maximum value kmax of the displacement amount k for each pixel. From Formula (6), kmax is obtained as follows.

$$k\max = \text{Def}m/(KX \cdot PY) \qquad (11)$$

PY is the extraction pitch of pixel data constituting the data series for calculating the correlation amount, and KX is a conversion factor determined by the divergence angle of the barycenters or centers of the pair of focus detection pupils.

Further, in consideration of the rough resolution of the Defm of the Def (x, y) supplied from the image enlarging unit 402, a fixed value k0 may be added to Formula (11) as a margin. In this case, kmax is obtained as follows.

$$k\max = \text{Def}m/(KX \cdot PY) + k0 \qquad (12)$$

In either case, the range of the displacement amount k is adjusted for each pixel so that kmax decreases as the defocus amount of the pixel decreases, and therefore the time for calculating the correlation amount C(k) can be shortened for pixels having a small defocus amount.

Then, based on the correlation amount C(k) obtained with respect to the discrete displacement amount k, the Def distribution calculating unit 401 uses Formulas (3) to (5) to obtain a shift amount x that provides a minimum value C(x) with respect to a continuous correlation amount. Further, based on the shift amount x, the Def distribution calculating unit 401 determines a defocus amount Def of the planned image forming surface of the subject image surface in accordance with Formula (6).

Thus, the Def distribution calculating unit 401 recalculates the defocus amount of pixels that correspond to the extraction data Rp (x, y) (pixels to which bokeh is added by the bokeh adding unit 407), and generates updated defocus distribution image data Def' (x, y) 406 (S660).

The bokeh adding unit 407 has the same configuration as the bokeh adding unit 308 included in the image processing unit 107 of the digital camera 100. For each pixel of the basic image data g (x, y) received from the digital camera 100, the bokeh adding unit 407 refers to a defocus amount Def indicated by the corresponding updated defocus distribution image data Def' (x, y) 406. Then, as shown in Formula (13), the bokeh adding unit 407 generates bokeh-added basic image data V (x, y) by applying a convolution operation on reduction point spread function PSF (x, y) corresponding to the Def to the pixel value of the g (x, y) (S670).

$$V(x,y) = g(x,y) \Diamond \text{PSF}(x,y) \qquad (13)$$

In Formula (13), ◇ denotes a two-dimensional convolution operation.

The bokeh-added basic image data V (x, y) is recorded in the recording device 205 in FIGS. 1C and 1s used by the user for printing as a final image for an ornamental purpose or for uploading to an SNS so as to share it with other users.

The reduction point spread function PSF (x, y) described in Formulas (8) to (10) can be used herein.

Although the bokeh adding unit 308 in FIG. 4 also performs the same processing as that performed by the bokeh adding unit 407 in FIG. 5, the bokeh adding unit 308 generates the bokeh-added reduced basic image data Vs (x, y), and therefore the processing performance required for the bokeh adding unit 308 is lower than that required for the bokeh adding unit 407. Accordingly, the bokeh adding unit 308 can be configured to have a smaller circuit scale and less power consumption than the bokeh adding unit 407.

In this way, according to this embodiment, when a defocus amount is calculated from a pair of captured image data sets obtained using an image sensor having a plurality of photoelectric conversion units for each pixel, the use of image data having a number of pixels that is cut (reduced) can increase the calculation speed of the defocus amount. Further, also in the case where image processing corresponding to the defocus amount is applied, the use of reduced image data for display can increase the processing speed.

Further, the image data to be recorded is a combination of basic image data having one set of data per pixel, defocus image data indicating a defocus amount obtained from reduced image data, and data indicating a region to which image processing corresponding to the defocus amount is to be applied. Therefore, the amount of the recording data can be reduced as compared to the case where data is recorded for each photoelectric conversion unit (the case where a plurality of data sets are recorded per pixel). Accordingly, the time required for recording the data to be recorded in a recording medium or transmitting it to the outside can be shortened, and the number of images that can be captured by the image capture apparatus can be increased.

Further, the processing load of the image capture apparatus can be lightened by using an image processing apparatus separate from the image capture apparatus for processing the image data to be recorded. Further, the defocus distribution data and the data indicating a region to which image processing corresponding to the defocus amount is to be applied are provided to the image processing apparatus, whereby it is possible to lighten the processing load required for recalculation of the defocus amount in the image processing apparatus.

In this embodiment, the basic image data, the reduced defocus distribution image data, and the extraction data are recorded or transmitted to an external device by the digital camera 100. However, other data may be used as long as it is a combination of the basic image data, the defocus distribution data based on the reduced image data, and the data indicating a region to which image processing corresponding to the defocus amount is to be applied.

Figure 6:
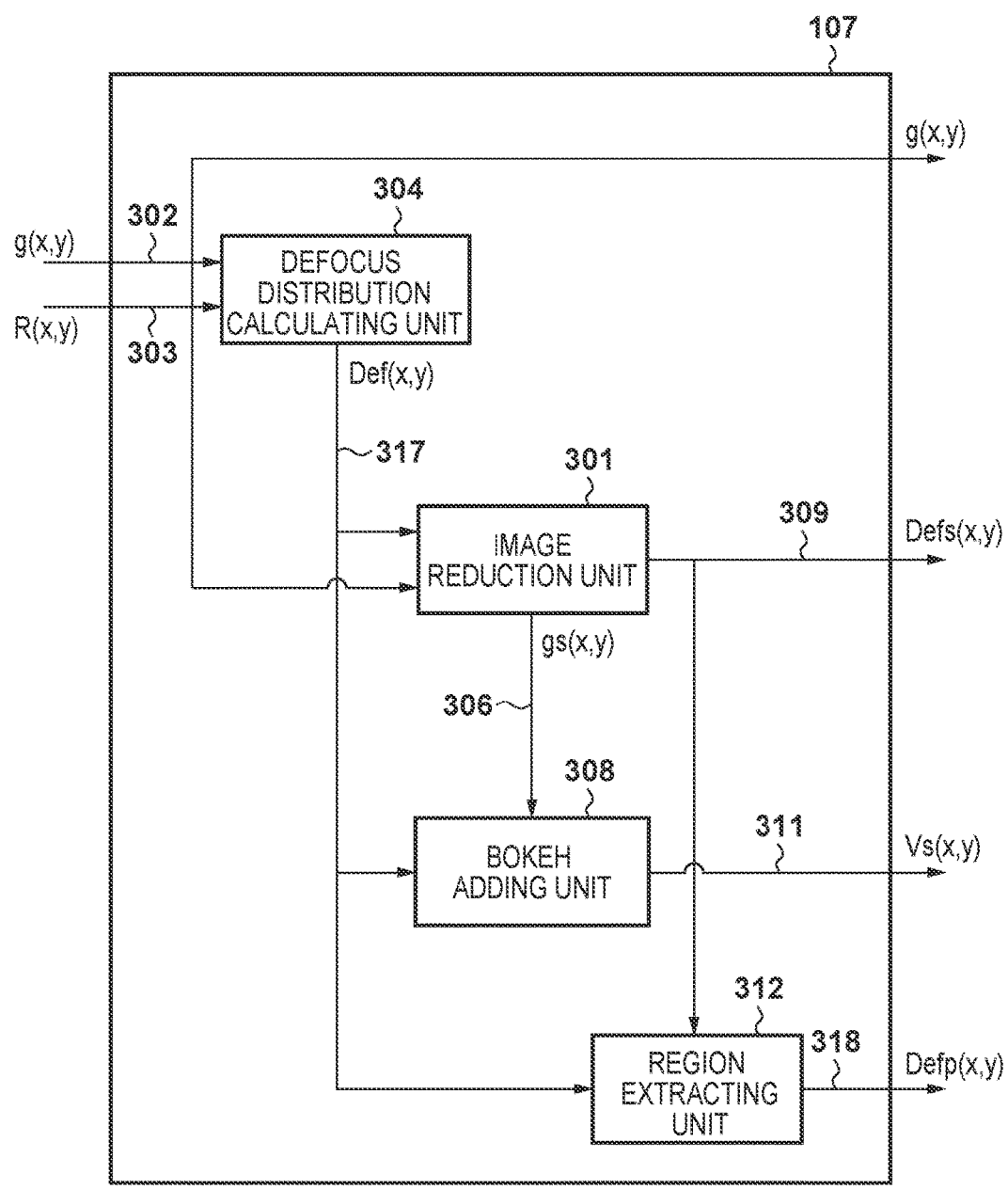
FIG. 6 is a block diagram showing another example of the functional configuration of the image processing unit 107 in FIG. 1B.

FIG. 6 is a block diagram showing another configuration example of the image processing unit 107. Here, the Def distribution calculating unit 304 generates defocus distribution image data Def (x, y) 317 from the g (x, y) 302 and the R (x, y) 305. Then, defocus distribution image data Defp (x, y) data extracted from the Def (x, y) by the region extracting unit 312 is output as the data indicating a region to which image processing corresponding to the defocus amount is to be applied. In this case, although the load for calculating the defocus amount cannot be lightened since reduced image data is not used, the need for the image enlarging unit 313 is eliminated. Further, the image reducing unit 301 reduces the Def (x, y) generated by the Def distribution calculating unit 304, so as to generate the Defs (x, y) 309. Reducing the number of pixels in the defocus distribution image is equivalent to decreasing the density of the defocus distribution.

In this case, Defp (x, y) is input instead of the Rp (x, y) and the g (x, y) in the Def distribution calculating unit 401 of the image processing unit 206. The Def distribution calculating unit 401 generates updated defocus distribution image data Def' (x, y) by substituting pixel data corresponding to the Defe (x, y) from the image enlarging unit 402 with pixel data (defocus amount) included in the Defp (x, y). In this case, since the resolution of the Defp (x, y) is equal to the resolution of the original image, there is no need for recalculation.

This embodiment has described a case of using an image capturing unit 105 having a pixel array in which a pair of photoelectric conversion units are arranged in the horizontal direction per microlens, as shown in FIG. 2, is described. However, the present invention can be applied also to the case of using an image capturing unit having a pair of photoelectric conversion units arranged in another direction or an image capturing unit in which three or more photoelectric conversion units are arranged per microlens.

Figure 9:
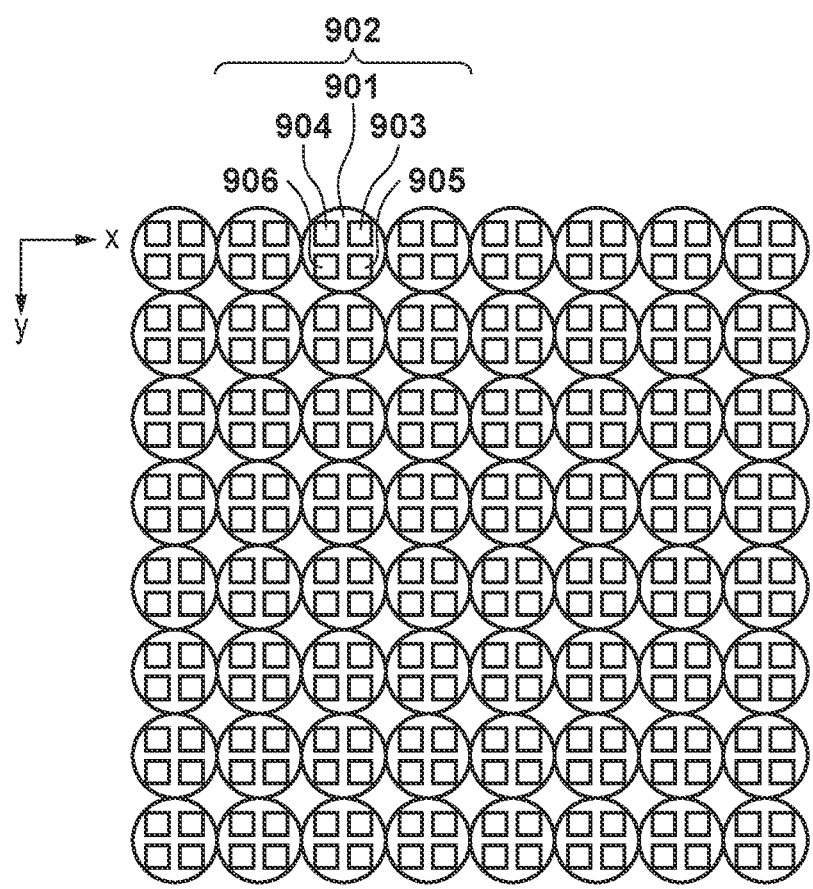
FIG. 9 is a diagram showing another example of the pixel array of the image capturing unit according to the embodiment.

FIG. 9 is a view showing another example of the pixel array of the image capturing unit 105. Each pixel 902 has a microlens 901 and photoelectric conversion units 903, 904, 905, and 906 that are arranged (divided) in the horizontal and the vertical direction. Here, image data that is obtained from the photoelectric conversion unit 903 group and corresponds to the upper right focus detection pupil is expressed as RT (x, y), and image data that is obtained from the photoelectric conversion unit 904 group and corresponds to the upper left focus detection pupil is expressed as LT (x, y) (where x and y are integers of 0 or more). Further, image data that is obtained from the photoelectric conversion unit 905 group and corresponds to the lower right focus detection pupil is expressed as RB (x, y), and image data that is obtained from the photoelectric conversion unit 906 group and corresponds to the lower left focus detection pupil is expressed as LB (x, y) (where x and y are integers of 0 or more). The image capturing unit 105 outputs R (x, y), T (x, y), and basic image data g (x, y) in the following formulas as captured image data sets.

$$L(x, y) = LT(x, y) + LB(x, y)$$

$$R(x, y) = RT(x, y) + RB(x, y)$$

$$T(x, y) = LT(x, y) + RT(x, y)$$

$$B(x, y) = LB(x, y) + RB(x, y)$$

$$g(x, y) = L(x, y) + R(x, y) = T(x, y) + B(x, y)$$

The L (x, y) and the R (x, y) are images equivalent to image data obtained when the pair of photoelectric conversion units are horizontally arranged. Further, the T (x, y) and the B (x, y) are images equivalent to image data to be obtained when the pair of photoelectric conversion units are vertically arranged. Further, while the aforementioned Rp (x, y) is extraction data obtained when the pair of photoelectric conversion units are horizontally arranged, extraction data obtained in the same manner when the pair of photoelectric conversion units are vertically arranged is referred to as Tp (x, y).

Figure 10:
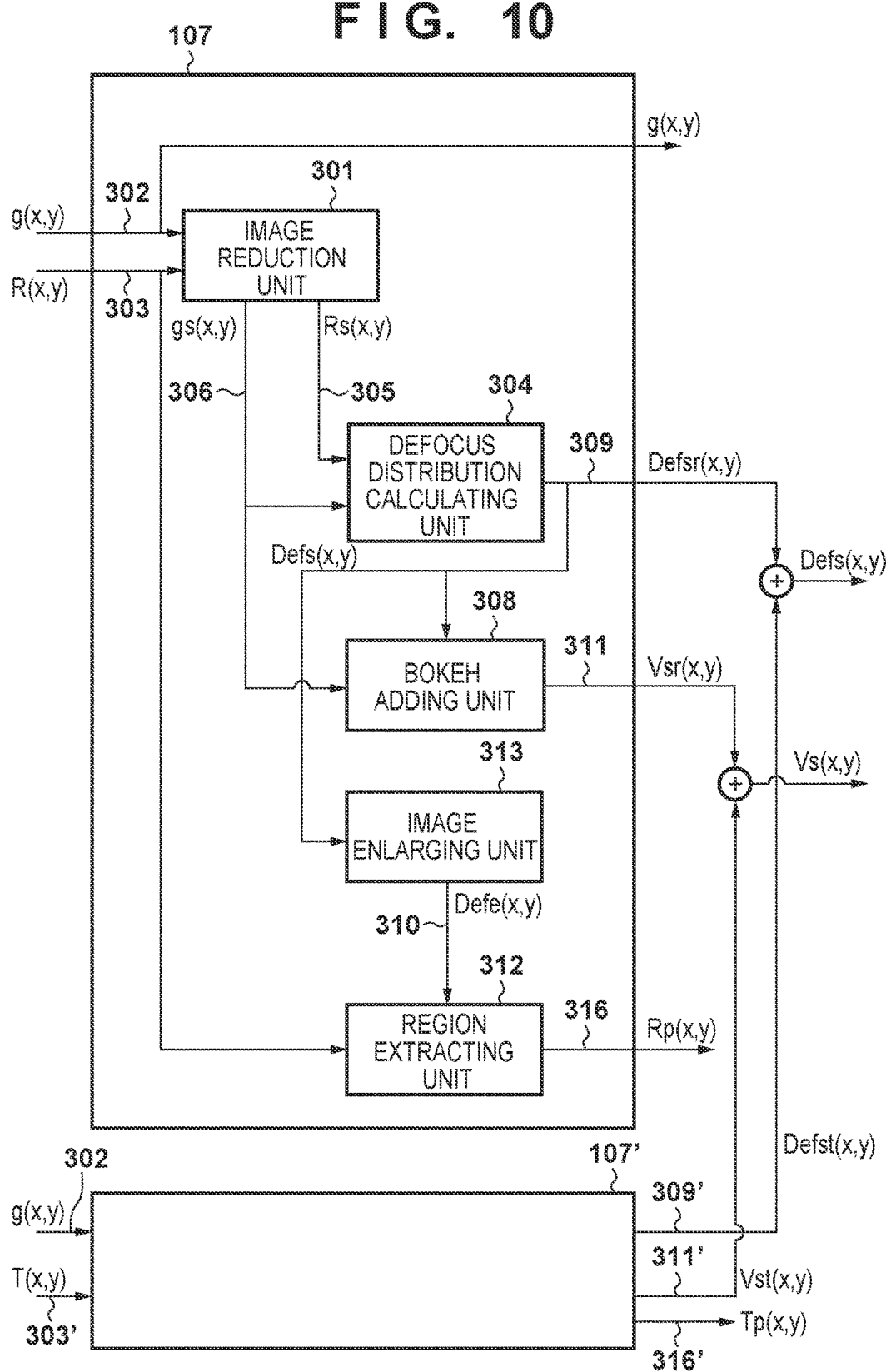
FIG. 10 is a block diagram showing another example of the functional configuration of the image processing unit 107 in FIG. 1B.

In this case, extraction data to be recorded or transmitted to an external device by the digital camera 100 is the Rp (x, y) and the Tp (x, y), as shown in FIG. 10. Further, bokeh-added reduced basic image data Vs (x, y) is determined by combining:

Vsr (x, y) based on the reduced defocus distribution image data Defs (x, y) determined based on the g (x, y) and Rs (x, y); and Vst (x, y) based on the reduced defocus distribution image data Defs (x, y) determined based on the g (x, y) and Ts (x, y). The same applies also to reduced defocus distribution image data Defs (x, y). The method for combining a plurality of image data sets may be achieved by adding and averaging, for example.

Since two pairs of image data sets are processed, FIG. 10 shows a configuration in which an image processing unit 107' having the same configuration as the image processing unit 107 is added, but this is for convenience of the description and for facilitating understanding thereof, and thus the addition of the image processing unit 107' is not essential.

Figure 11:
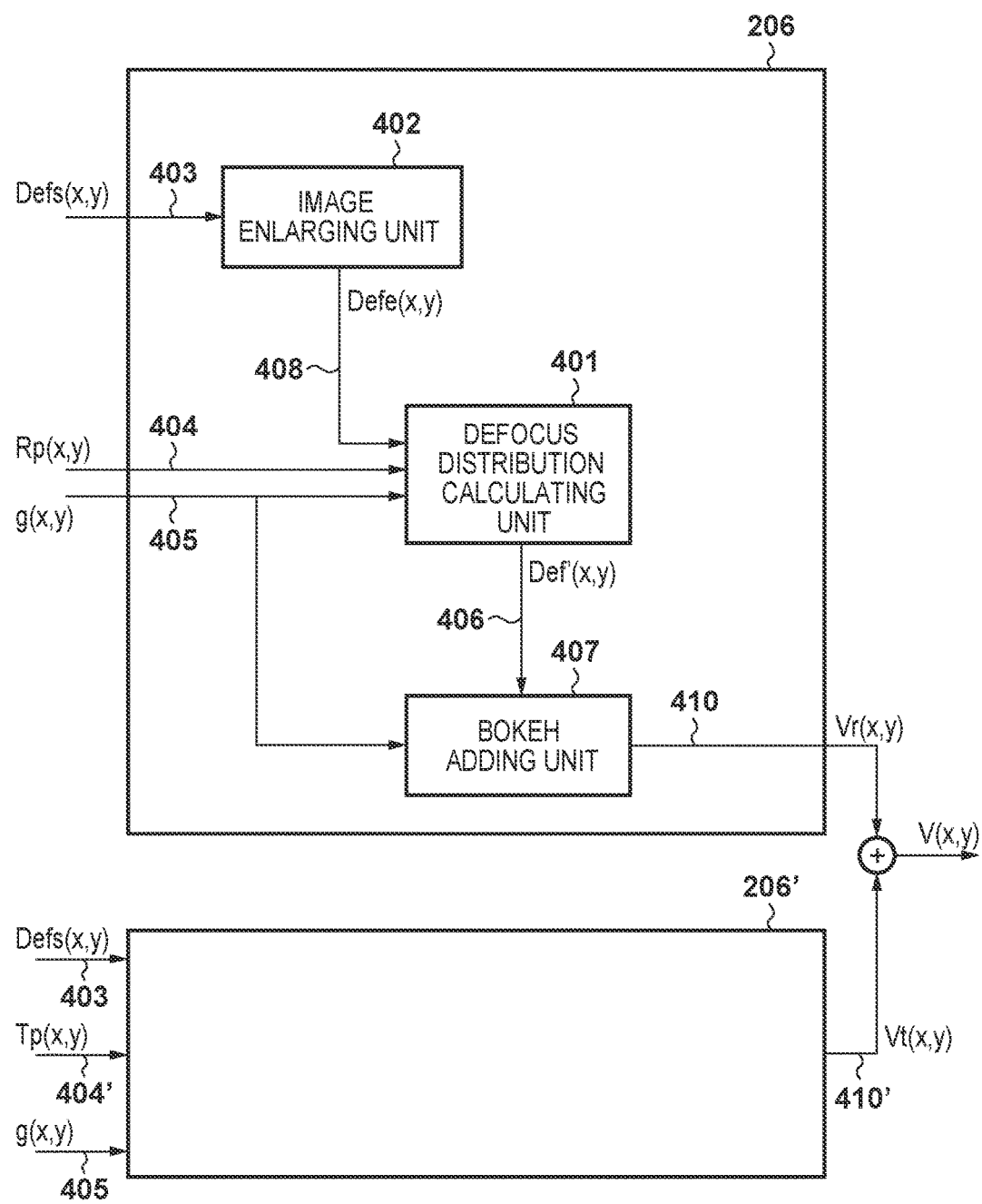
FIG. 11 is a block diagram showing another example of the functional configuration of the image processing unit 206 in FIG. 1C.

Further, an image processing unit 206' having the same configuration as the image processing unit 206 is similarly added also for generation of bokeh-added basic data, as shown in FIG. 11. Then, bokeh-added basic image data Vr (x, y) obtained from the Rp (x, y) and bokeh-added basic image data Vt (x, y) obtained from the Tp (x, y) are combined so that bokeh-added basic image data V (x, y) is generated. The combining, for example, may be achieved by adding and averaging.

In the case where only focus detection information Rp (x, y) in the horizontal direction is provided, horizontally striped objects cannot be appropriately processed. In contrast, use of both the focus detection information Rp (x, y) in the horizontal direction and focus detection information Tp (x, y) in the vertical direction as shown in FIG. 11 enables the bokeh-added basic image data V (x, y) in which vertically striped objects and horizontally striped objects are both appropriately processed to be output.

Second Embodiment

Next, an image processing system according to a second embodiment of the present invention will be described. The image processing system in this embodiment can be constituted by the digital camera 100 and the PC 200 described in the first embodiment, and therefore redundant descriptions will be omitted.

Figure 7:
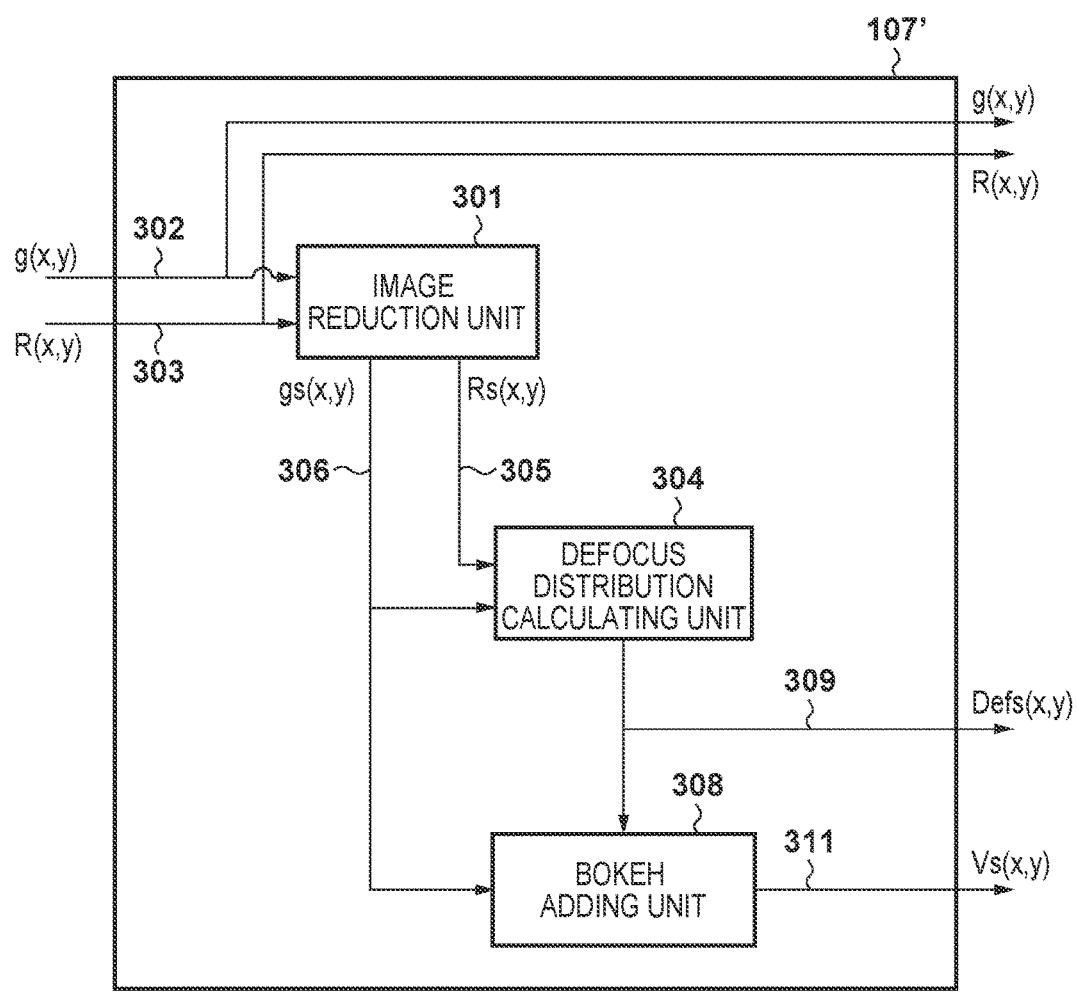
FIG. 7 is a block diagram showing an example of a functional configuration of an image processing unit 107 according to a second embodiment.

FIG. 7 is a block diagram showing an example of a functional configuration of the image processing unit 107' included in the digital camera 100 in this embodiment. In FIG. 7, the same components as in FIG. 4 are denoted by the same reference numerals. The image processing unit 107' of this embodiment does not have the image enlarging unit 313 and the region extracting unit 312 in the first embodiment.

In this embodiment, the digital camera 100 generates the following data as data to be recorded.

Basic image data g (x, y) (6400×4800 pixels)
Image data R (x, y) corresponding to the right focus detection pupil (6400×4800 pixels)
Reduced defocus distribution image data Defs (x, y) (1600×1200 pixels)

Accordingly, in this embodiment, the amount of data to be recorded in the recording medium 108 or transmitted from the communication unit 109 to the PC 200 is greater than in the case of transmitting the R (x, y) and the L (x, y).

However, since the calculation of the defocus amount is performed based on the reduced image data, the processing load of the Def distribution calculating unit 304 can be significantly lightened. Further, the processing implemented by the image enlarging unit 313 and the region extracting unit 312 can be omitted.

Figure 8:
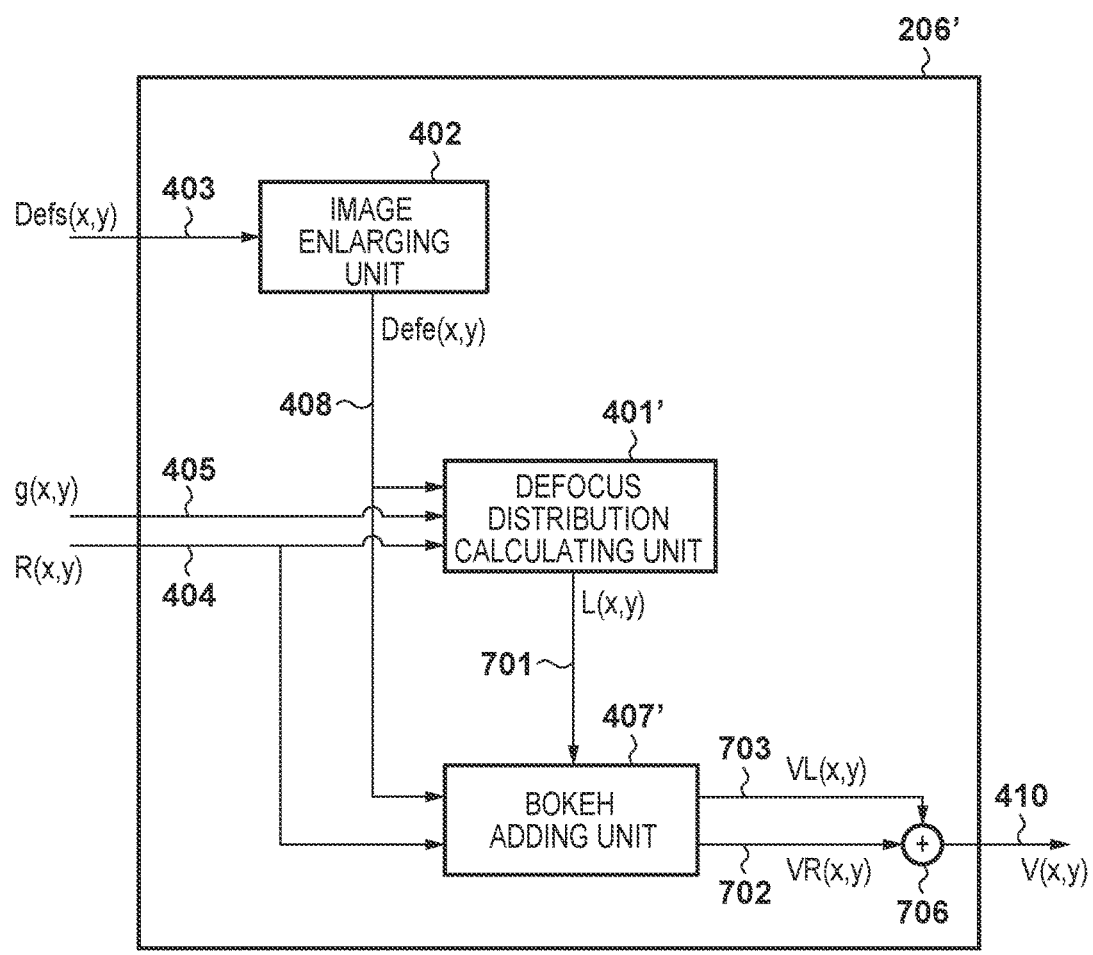
FIG. 8 is a block diagram showing an example of a functional configuration of an image processing unit 206 according to the second embodiment.

FIG. 8 is a block diagram showing an example of a functional configuration of the image processing unit 206' included in the PC 200 in this embodiment. In FIG. 8, the same components as in FIG. 5 are denoted by the same reference numerals. The image processing unit 206' of this embodiment is different from the first embodiment in a part of operations of the Def distribution calculating unit 401' and the bokeh adding unit 407'.

The Def distribution calculating unit 401' in this embodiment determines whether or not the defocus amount indicated by the defocus distribution image data Defe (x, y) obtained from the image enlarging unit 402 is included in the range of the defocus amount in which the bokeh adding unit 407' controls a bokeh amount. This determination is the same as the determination of the necessity of recalculation (update) in the first embodiment. Then, in the case where it is determined that the recalculation (update) of the defocus amount is necessary, the Def distribution calculating unit 401' recalculates the defocus amount.

In this embodiment, the R (x, y) is input instead of the Rp (x, y), but the basic calculation method is the same as in the first embodiment. The Def distribution calculating unit 401' uses image data L (x, y) that corresponds to the left focus detection pupil and is obtained by subtracting image data R (x, y) that corresponds to the right focus detection pupil from the basic image data g (x, y), instead of the Lp (x, y) in the first embodiment.

Also in this embodiment, the defocus amount is recalculated only for pixels whose bokeh amount is controlled by the bokeh adding unit 407', and therefore the processing load for calculating the defocus amount can be significantly lightened. Further, the recalculated defocus amount shows higher resolution than the defocus amount obtained from the image enlarging unit 402, and therefore high-accuracy bokeh adding processing can be realized.

In the same manner as in the first embodiment, the maximum value kmax of the displacement amount k is adjusted for each pixel, thereby shortening the time to calculate the correlation amount C(k) in pixels having small defocus amounts, and therefore the processing can be implemented at high speed.

In this embodiment, the Def distribution calculating unit 401' receives the entire image data R (x, y) that corresponds to the right focus detection pupil, instead of the Rp (x, y) that is a part of the R (x, y). Then, by subtracting the R (x, y) from the basic image data g (x, y), the Def distribution calculating unit 401' restores the entirety of the image data L (x, y) 701 that corresponds to the left focus detection pupil. The L (x, y) 703 is used for recalculating the defocus amount, and is output to the bokeh adding unit 407'.

The bokeh adding unit 407' carries out the bokeh adding processing on the R (x, y) and the L (x, y) using the same method applied to the basic image data g (x, y) in the first embodiment and outputs image data VR (x, y) 702 and VL (x, y) 703 resulting from the bokeh addition. An adder 706 adds the VR (x, y) 702 and the VL (x, y) 703, and generates and outputs bokeh-added basic image data V (x, y) 410.

In the first embodiment, the bokeh-added basic image data V (x, y) is generated by performing the bokeh adding processing after the basic image data g (x, y) is generated. In contrast, in this embodiment, after the bokeh adding processing is applied separately to the image data R (x, y) that corresponds to the right focus detection pupil and the image data L (x, y) that corresponds to the left focus detection pupil, they are added to each other so that the bokeh-added basic image data V (x, y) is generated.

The bokeh in the pupil-divided image data (image data that corresponds to the right focus detection pupil and the left focus detection pupil) depends on the individual optical transfer functions. Therefore, bokeh addition with higher accuracy can be achieved by generating the basic image data after applying the bokeh adding processing to the pupil-divided image data (R (x, y) and L (x, y)) at such a stage, as compared to applying the bokeh adding processing to the basic image data. This effect applies not only to the case of applying the bokeh adding processing but also to the cases of applying image processing that depends on the optical transfer function for forming a pupil-divided image.

In this embodiment, the data generated for recording by the digital camera 100 may be another combination. For example, the image data L (x, y) that corresponds to the left focus detection pupil may be used instead of the image data R (x, y) that corresponds to the right focus detection pupil. Further, a combination of the image data R (x, y) that corresponds to the right focus detection pupil, the image data L (x, y) that corresponds to the left focus detection pupil, and the reduced defocus distribution image data may be used. In this case, in processing in which the g (x, y) is needed, the g (x, y) may be generated by addition of the L (x, y) and the R (x, y).

According to this embodiment, although the amount of data for recording and communication slightly increases as compared to that in conventional methods, the processing load for calculating the defocus amount can be significantly reduced and the overall processing speed can be increased. Further, since the basic image data resulting from the bokeh processing is generated from the pupil-divided image data that has undergone the bokeh processing, the accuracy of the bokeh adding processing can be improved as compared to the method of the first embodiment.

This embodiment also can be applied to the case of using an image capturing unit having a pair of photoelectric conversion units arranged in another direction different from the horizontal direction or an image capturing unit in which three or more photoelectric conversion units are arranged per microlens, by being configured as shown in FIG. 10 and FIG. 11.

Exemplary embodiments of the present invention have been described above, but the present invention is not limited to these embodiments, and various modifications and changes can be made within the range specified in the scope of claims.

Other Embodiments

In the aforementioned embodiments, descriptions are given on the assumption that image processing to be performed according to the defocus amount on the basic image data (non-reduced image data) is implemented by the image processing apparatus that is separate from the image capture apparatus. However, the image processing may be implemented by the image capture apparatus, for example, by incorporating the image processing apparatus in the image capture apparatus, or allowing the control unit 101 of the image capture apparatus to perform the functions of the image processing apparatus. Also in such cases, the effect of cutting the amount of data for recording can be achieved. For example, in the case where the communication unit 109 cannot communicate with the image processing apparatus normally (for example, in the case of poor wireless communication quality), the image processing may be implemented in the digital camera 100. The processing time will be longer than in the case of the implementation in an external image processing apparatus, but a final image can be created even in a non-communicable environment.

Further, the aforementioned embodiments describe a configuration in which a pair of captured image data sets that are obtained by an image sensor, whose pixels each have a plurality of photoelectric conversion units, receiving luminous fluxes that have passed through different regions on the exit pupil, and the pair of captured image data sets are used for calculating the defocus amount. However, the pair of captured image data sets that can be used for calculating the defocus amount may be obtained using another method. For example, the pair of captured image data sets may be a pair of captured image data sets obtained by a stereo camera or a pair of captured image data sets obtained by shooting while the focus distance is changed. In such a case, the aforementioned processing may be performed using one of the pair of sets of image data as the R (x, y) and the other thereof as the L (x, y). That is, the configurations of these embodiments are applicable also to a digital camera including an image sensor without the pupil dividing function.

Further, in the aforementioned embodiments, a case was described in which bokeh adding processing is performed as the image processing applied according to the defocus amount, and therefore the point spread function is also configured to implement a low-pass filter for the purpose of bokeh addition. However, other image processing can be performed. For example, in image processing for sharpening an image by applying a band-pass filter, the properties of the band-pass filter may be changed using a parameter that corresponds to the defocus amount. In this way, even in the case where the amount of light is insufficient and thus the aperture opening needs to be widened in order to perform shooting, image data with a large depth of field can be obtained from the captured image data.

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095505, filed May 2, 2014, which is hereby incorporated by reference herein in its entirety.

What is claimed is:

1. An image capture apparatus comprising:
an image sensor having a plurality of pixels, wherein each of the plurality of pixels has a plurality of photoelectric conversion units that respectively receives luminous fluxes that have passed through different regions on an exit pupil of an optical system;
one or more processors; and
a memory storing instructions which, when the instructions are executed by the one or more processors, cause the image capturing apparatus to:
obtain a plurality of first image data respectively corresponding to the different regions of the exit pupil, and a second image data corresponding to a plurality of regions of the exit pupil;
reduce the plurality of first image data;
generate distribution data representing distribution of defocus amount in the plurality of first image data;
generate extracted data for obtaining distribution data having higher resolution than the distribution data based on the first image data and the second image data; and
output the extracted data, the distribution data, and the second image data to be recorded in the image capture apparatus or transmitted outside.

2. The image capture apparatus according to claim 1, wherein
the distribution data is generated by combining a plurality of distribution data in the plurality of the first image data.

3. The image capture apparatus according to claim 1, wherein the extracted data is a part of the first image data.

4. The image capture apparatus according to claim 1, wherein the extracted data corresponds regions having a defocus amount in a predetermined range.

5. The image capture apparatus according to claim 1, wherein the extracted data is distribution data extracted by the generated distribution data.

6. An image processing apparatus comprising:
one or more processors; and
a memory storing instructions which, when the instructions are executed by the one or more processors, cause the image processing apparatus to:
obtain the extracted data, the distribution data, and the second image data, which are output of the image capture apparatus according to claim 1;

convert, based on the extracted data, the distribution data into distribution data indicating a defocus distribution in the second image data; and apply, based on the converted distribution data, predetermined image processing to pixel data having a defocus amount in a predetermined range, out of pixel data constituting the second image data.

7. The image processing apparatus according to claim 6, wherein the obtained distribution data indicates a defocus amount for each pixel of reduced image data, and the image processing apparatus converts the distribution data into distribution data indicating a defocus distribution in the second image data by enlarging the distribution data so as to indicate the defocus amount for each pixel of the second image data, and thereafter recalculates the defocus amount of the pixel corresponding to the extracted data.

8. The image processing apparatus according to claim 6, the image processing apparatus being incorporated in the image capture apparatus.

9. The image processing apparatus according to claim 6, the image processing apparatus being a device external to the image capture apparatus.

10. An image processing system formed by communicably connecting the image capture apparatus and the image processing apparatus according to claim 9 to each other.

11. A method for controlling an image processing apparatus, comprising:

obtaining the extracted data, the distribution data, and the second image data, which are output of the image capture apparatus according to claim 1;

converting, based on the extracted data, the distribution data into distribution data indicating a defocus distribution in the second image data; and applying, based on the converted distribution data, predetermined image processing to pixel data having a defocus amount in a predetermined range, out of pixel data constituting the second image data.

12. A non-transitory computer-readable medium that stores a program for causing, when executed by a computer, the computer to function as an image processing apparatus comprising:

an obtaining unit that obtains the extracted data, the distribution data, and the second image data, which are output of the image capture apparatus according to claim 1;

a conversion unit that converts, based on the extracted data, the distribution data into distribution data indicating a defocus distribution in the second image data; and an application unit that applies, based on the converted distribution data, predetermined image processing to pixel data having a defocus amount in a predetermined range, out of pixel data constituting the second image data.

13. A method for controlling an image capture apparatus, comprising:

obtaining a plurality of first image data and a second image data, wherein the first image data is captured by an image sensor having a plurality of pixels, each of which has a plurality of photoelectric conversion units that respectively receives luminous fluxes that have passed through different regions on an exit pupil of an optical system, and respectively corresponds to the different regions of the exit pupil, and a second image data is captured by the image sensor and corresponds to a plurality of regions of the exit pupil;

reducing the plurality of first image data;

generating distribution data representing distribution of defocus amount in the plurality of first image data, and generating extracted data for obtaining distribution data having higher resolution than the distribution data based on the first image data and the second image data;

outputting the extracted data, the distribution data, and the second image data to be recorded in the image capture apparatus or transmitted outside.

14. A non-transitory computer-readable medium that stores a program for causing, when executed by a computer, the computer to function as an image capture apparatus comprising:

an obtaining unit that obtains a plurality of first image data respectively corresponding to the different regions of the exit pupil, and a second image data corresponding to a plurality of regions of the exit pupil;

a reduction unit that reduces the plurality of first image data;

a first generation unit that generates distribution data representing distribution of defocus amount in the plurality of first image data;

a second generation unit that extracts data for obtaining distribution data having higher resolution than the distribution data based on the first image data and the second image data; and an output unit that outputs the extracted data, the distribution data, and the second image data to be recorded in the image capture apparatus or transmitted outside.

* * * * *